(12) United States Patent
Wolters et al.

(10) Patent No.: US 9,511,559 B2
(45) Date of Patent: Dec. 6, 2016

(54) CONTAINER FOR FOODSTUFF MADE FROM AN ALUMINIUM-FREE PLANAR COMPOSITE WITH A COVERED HOLE AS PART OF A CLOSURE SYSTEM

(75) Inventors: Michael Wolters, Heinsberg (DE); Stefan Pelzer, Herzogenrath (DE)

(73) Assignee: SIG Technology AG, Neuhausen (CH)

( * ) Notice: Subject to any disclaimer, the term of this patent is extended or adjusted under 35 U.S.C. 154(b) by 290 days.

(21) Appl. No.: 13/575,340

(22) PCT Filed: Jan. 26, 2011

(86) PCT No.: PCT/EP2011/000345
§ 371 (c)(1),
(2), (4) Date: Nov. 21, 2012

(87) PCT Pub. No.: WO2011/092002
PCT Pub. Date: Aug. 4, 2011

(65) Prior Publication Data
US 2013/0056468 A1    Mar. 7, 2013

(30) Foreign Application Priority Data

Jan. 27, 2010 (DE) .................. 10 2010 006 036

(51) Int. Cl.
*B32B 27/32* (2006.01)
*B31B 1/84* (2006.01)
(Continued)

(52) U.S. Cl.
CPC .............. *B31B 1/84* (2013.01); *B29C 65/02* (2013.01); *B29C 66/4322* (2013.01);
(Continued)

(58) Field of Classification Search
CPC ...... B32B 27/306; B32B 27/32; B32B 27/327;
B32B 27/34; B32B 3/26; B65D 5/70; B65D 75/58; B65D 75/5894; B65D 75/00; B65D 5/024; B65D 43/08; B65D 43/10; B31B 1/14
(Continued)

(56) References Cited

U.S. PATENT DOCUMENTS 4,348,449 A   9/1982 Seufert
4,754,917 A   7/1988 Gordon et al.
(Continued)

FOREIGN PATENT DOCUMENTS

EP    0242720 A2    10/1987
EP    1059162 A2    12/2000
(Continued)

OTHER PUBLICATIONS

International Search Report for PCT/EP2011/000315 mailed Jun. 29, 2011.
(Continued)

*Primary Examiner* — Walter B Aughenbaugh
(74) *Attorney, Agent, or Firm* — Meunier Carlin & Curfman LLC

(57) ABSTRACT

A planar composite for the production of a container surrounding an interior having a. a carrier layer; b. a barrier layer of plastic joined to the carrier layer; c. at least two layers of thermoplastic plastic which are provided on the side of the barrier layer of plastic facing away from the carrier layer. The carrier layer has at least one hole which is covered by the barrier layer of plastic and the at least two layers of thermoplastic plastic. The composite is useful for the production of a container. Also disclosed is a process for the production of a container using the composite and a container obtainable by this process.

20 Claims, 9 Drawing Sheets

Figure 1:
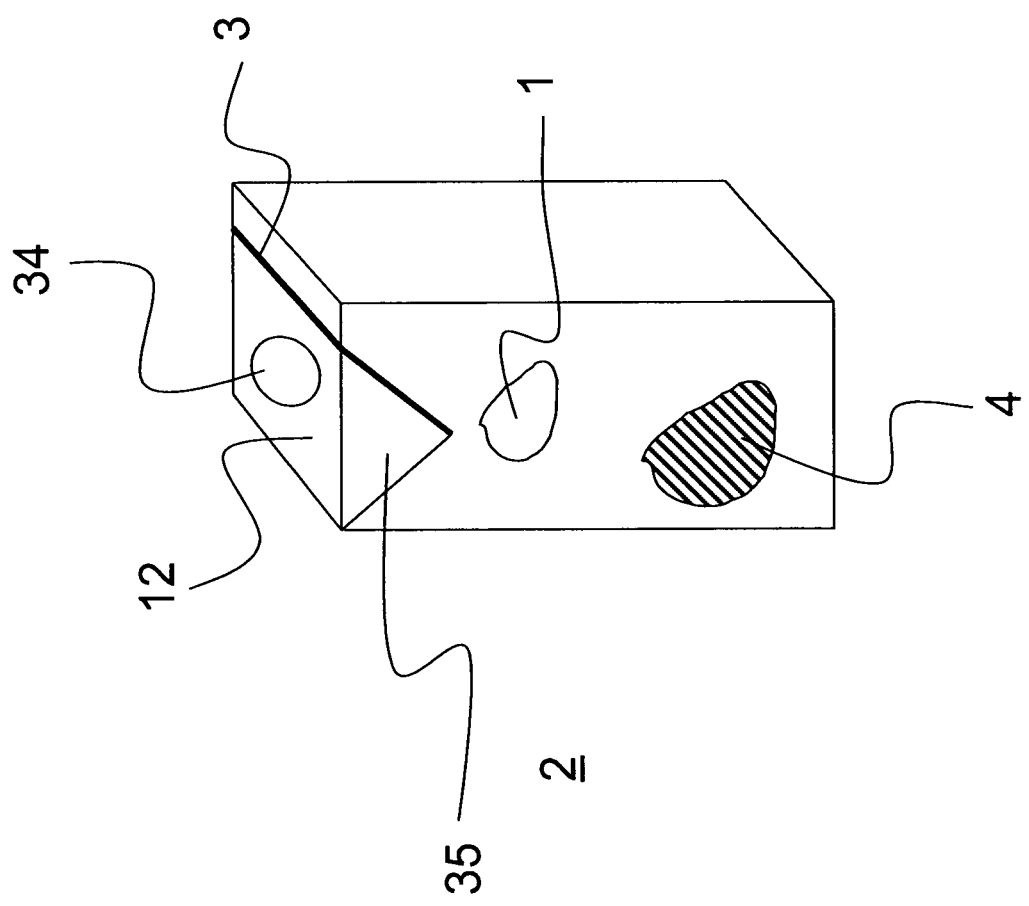

(51) Int. Cl.

| | | |
|---|---|---|
| *B65D 75/00* | (2006.01) | |
| *B65D 5/70* | (2006.01) | |
| *B65D 75/58* | (2006.01) | |
| *B65B 5/02* | (2006.01) | |
| *B65B 43/08* | (2006.01) | |
| *B65B 43/10* | (2006.01) | |
| *B31B 1/14* | (2006.01) | |
| *B32B 3/26* | (2006.01) | |
| *B31B 7/00* | (2006.01) | |
| *B32B 7/02* | (2006.01) | |
| *B32B 27/08* | (2006.01) | |
| *B32B 27/10* | (2006.01) | |
| *B32B 27/30* | (2006.01) | |
| *B32B 27/34* | (2006.01) | |
| *B29C 65/02* | (2006.01) | |
| *B29C 65/08* | (2006.01) | |
| *B29C 65/10* | (2006.01) | |
| *B29C 65/14* | (2006.01) | |
| *B29C 65/18* | (2006.01) | |
| *B29C 65/26* | (2006.01) | |
| *B29C 65/00* | (2006.01) | |

(52) U.S. Cl.
CPC .. *B29C 66/43122* (2013.01); *B29C 66/91411* (2013.01); *B29C 66/91935* (2013.01); *B31B 1/14* (2013.01); *B31B 7/00* (2013.01); *B32B 3/26* (2013.01); *B32B 7/02* (2013.01); *B32B 27/08* (2013.01); *B32B 27/10* (2013.01); *B32B 27/306* (2013.01); *B32B 27/32* (2013.01); *B32B 27/327* (2013.01); *B32B 27/34* (2013.01); *B65B 5/024* (2013.01); *B65B 43/08* (2013.01); *B65B 43/10* (2013.01); *B65D 5/70* (2013.01); *B65D 75/00* (2013.01); *B65D 75/58* (2013.01); *B65D 75/5894* (2013.01); *B29C 65/08* (2013.01); *B29C 65/10* (2013.01); *B29C 65/14* (2013.01); *B29C 65/1406* (2013.01); *B29C 65/1412* (2013.01); *B29C 65/1425* (2013.01); *B29C 65/18* (2013.01); *B29C 65/26* (2013.01); *B29C 66/71* (2013.01); *B29C 66/7234* (2013.01); *B29C 66/7392* (2013.01); *B29C 66/73115* (2013.01); *B29C 66/851* (2013.01); *B29C 66/919* (2013.01); *B29C 66/91933* (2013.01); *B31B 2201/9085* (2013.01); *B31B 2217/0084* (2013.01); *B32B 2270/00* (2013.01); *B32B 2307/31* (2013.01); *B32B 2307/7242* (2013.01); *B32B 2439/62* (2013.01); *B32B 2439/70* (2013.01); *Y10T 428/1352* (2015.01); *Y10T 428/24331* (2015.01)

(58) Field of Classification Search
USPC .............................. 428/34.1–34.9, 35.2–35.4, 35.7–35.9, 428/36.4–36.91, 131–140, 411.1, 474.4, 475.5, 428/475.8, 476.1, 476.3, 476.9, 477.7, 500, 428/515–519, 521, 523
See application file for complete search history.

(56) References Cited

U.S. PATENT DOCUMENTS

| | | | |
|---|---|---|---|
| 4,782,646 A | 11/1988 | Nantin | |
| 4,888,222 A | 12/1989 | Gibbons et al. | |
| 4,909,434 A * | 3/1990 | Jones | B29C 65/08 220/258.2 |
| 5,183,706 A * | 2/1993 | Bekele | B32B 27/08 156/244.11 |
| 5,452,849 A * | 9/1995 | Schramer | B65D 5/708 220/270 |
| 5,695,839 A | 12/1997 | Yamada et al. | |
| 6,274,246 B1 | 8/2001 | Eggers et al. | |
| 6,436,547 B1 | 8/2002 | Toft et al. | |
| 6,517,918 B1 | 2/2003 | Rohde | |
| 6,627,274 B1 | 9/2003 | Ginossatis et al. | |
| 7,033,455 B1 | 4/2006 | Berlin et al. | |
| 7,344,759 B2 | 3/2008 | Penttinen et al. | |
| 2001/0021460 A1 | 9/2001 | Kong et al. | |
| 2002/0192405 A1 | 12/2002 | Schwartz et al. | |
| 2005/0037162 A1 | 2/2005 | Adams | |
| 2005/0250633 A1 | 11/2005 | Boldrini et al. | |
| 2007/0197363 A1 | 8/2007 | Parrotta et al. | |

FOREIGN PATENT DOCUMENTS

| | | | |
|---|---|---|---|
| EP | 1232856 A1 | 8/2002 | |
| EP | 1724108 A1 | 11/2006 | |
| FR | 2339473 | 8/1977 | |
| WO | 93/22131 | 11/1993 | |
| WO | 98/03332 | 1/1998 | |
| WO | WO 98/14317 * | 4/1998 | ............ B29C 59/02 |
| WO | 98/26994 | 6/1998 | |
| WO | 02/090206 A1 | 11/2002 | |
| WO | 2008/012397 | 1/2008 | |
| WO | 2009/112255 | 9/2009 | |

OTHER PUBLICATIONS

Written Opinion for PCT/EP2011/000315 mailed Jun. 29, 2011.
International Preliminary Report on Patentability for PCT/EP2011/000315 mailed Jul. 31, 2012.
International Search Report for PCT/EP2011/000316 mailed Jun. 29, 2011.
Written Opinion for PCT/EP2011/000316 mailed Jun. 29, 2011.
International Preliminary Report on Patentability for PCT/EP2011/000316 mailed Jul. 31, 2012.
International Search Report for PCT/EP2011/000345 mailed Jun. 29, 2011.
Written Opinion for PCT/EP2011/000345 mailed Jun. 29, 2011.
International Preliminary Report on Patentability for PCT/EP2011/000345 mailed Jul. 31, 2012.
Copending U.S. Appl. No. 13/575,331, filed Jul. 26, 2012 (and its prosecution history).
Copending U.S. Appl. No. 13/575,332, filed Jul. 26, 2012 (and its prosecution history).
U.S. Appl. No. 13/575,331, filed Jan. 26, 2011.
U.S. Appl. No. 13/575,332, filed Jan. 26, 2011.

* cited by examiner

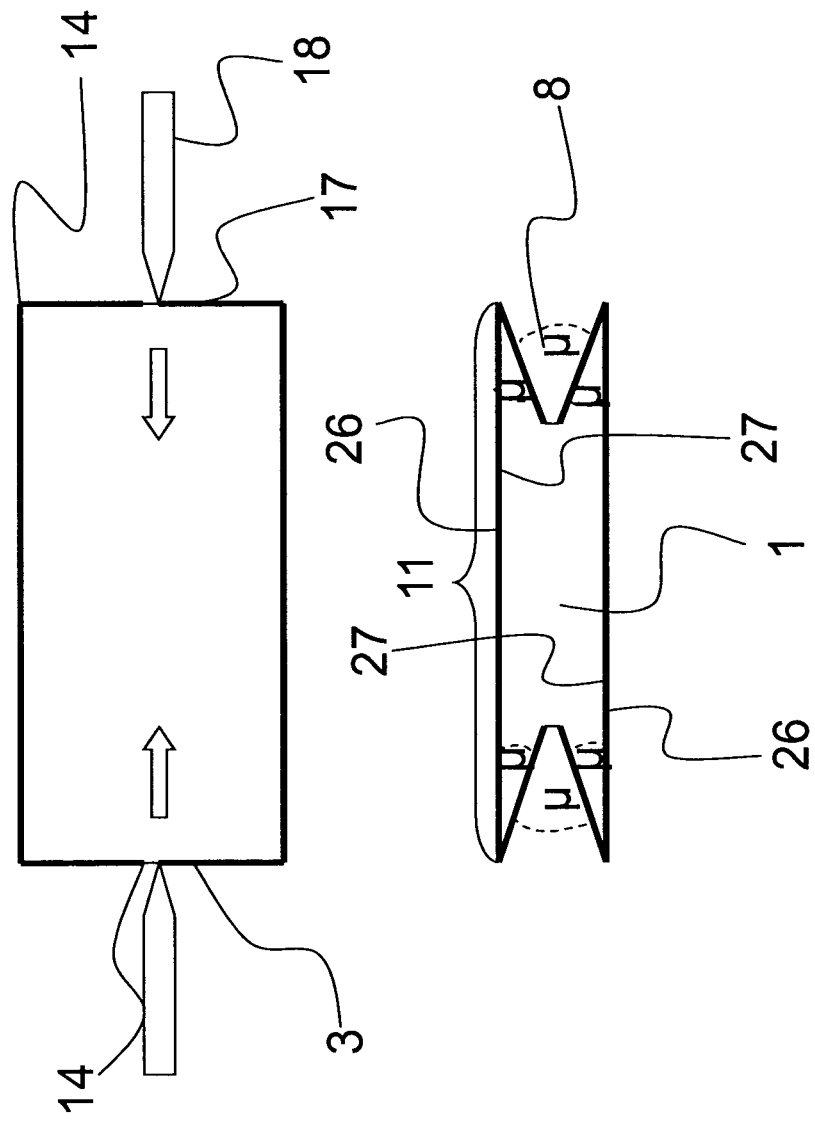

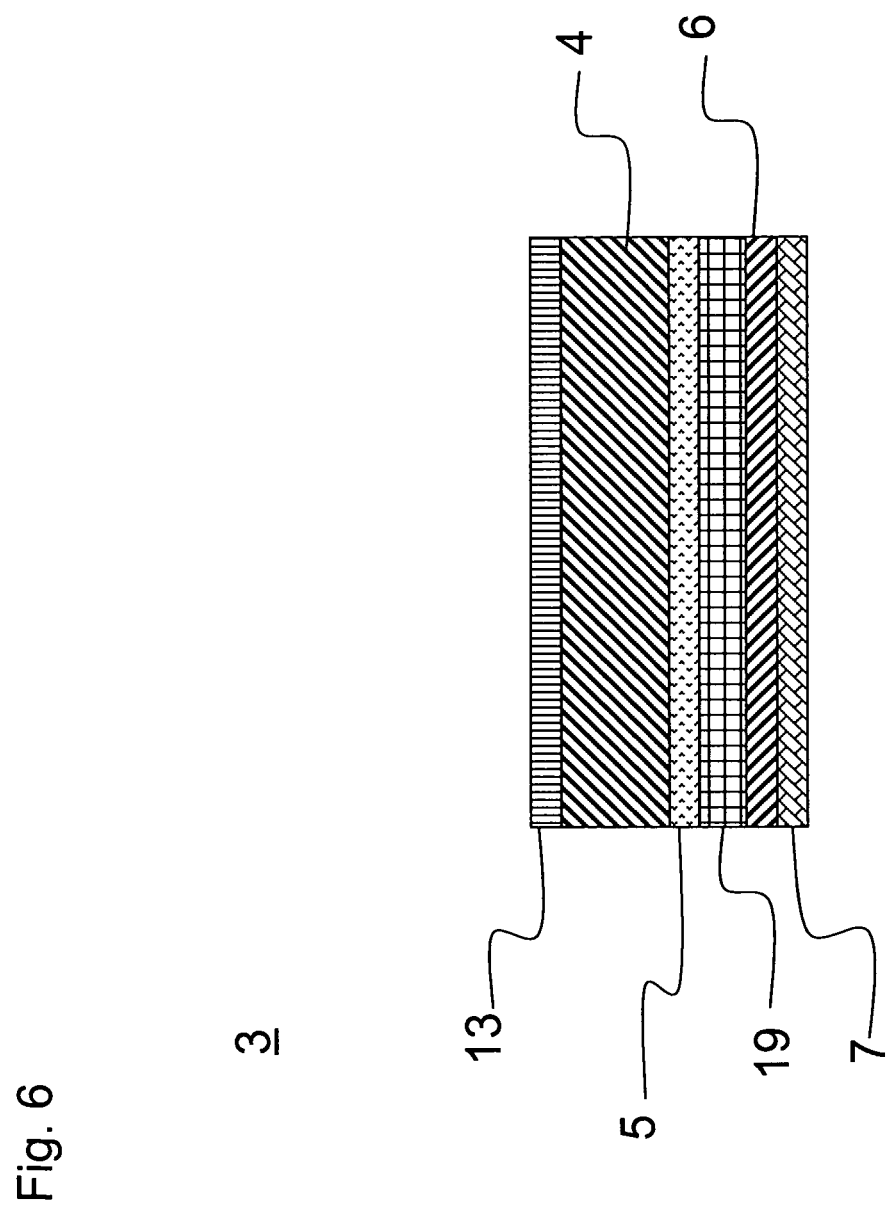

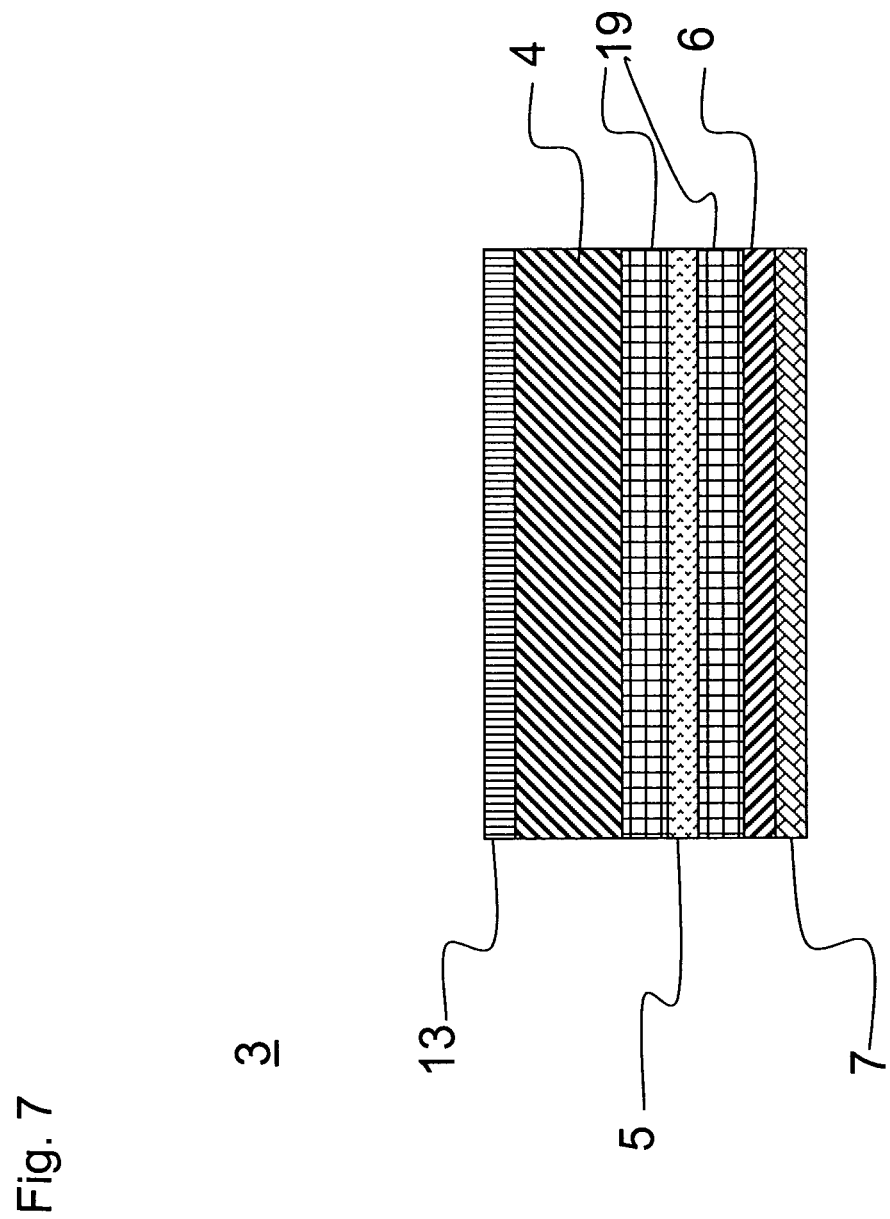

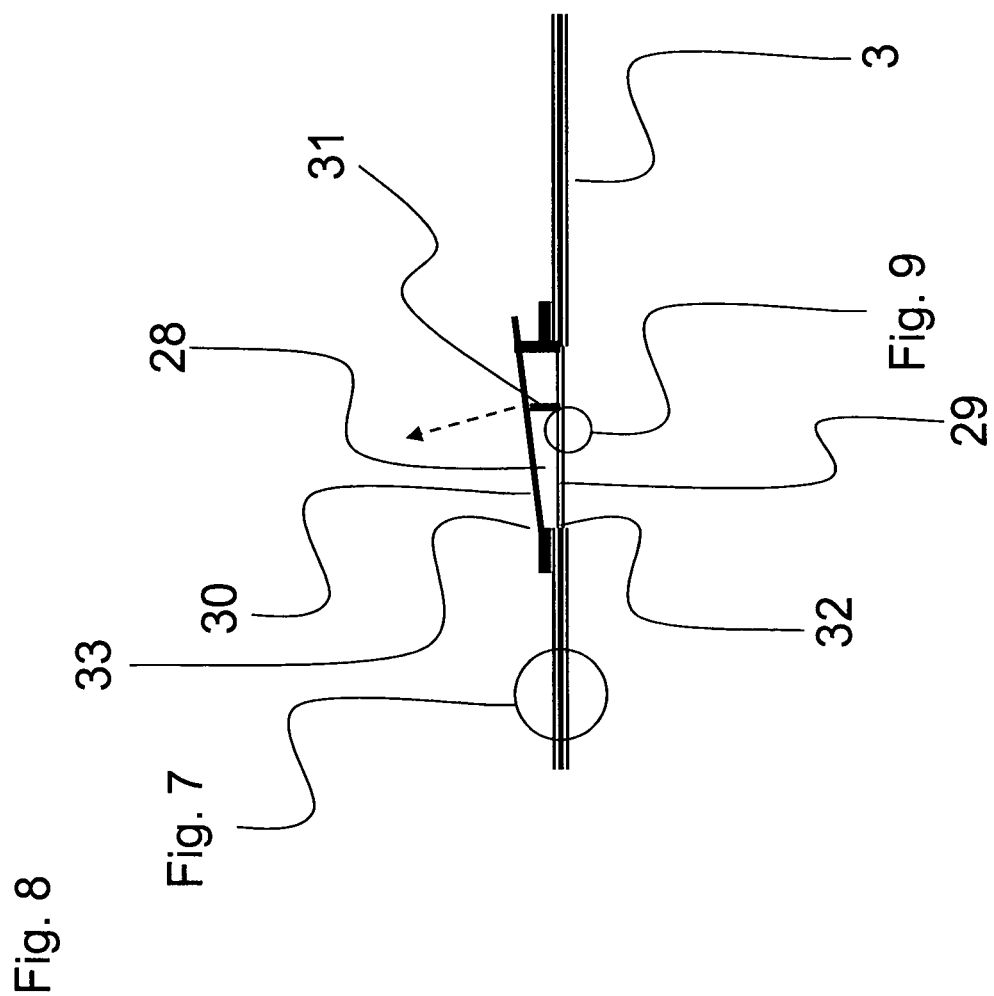

CONTAINER FOR FOODSTUFF MADE FROM AN ALUMINIUM-FREE PLANAR COMPOSITE WITH A COVERED HOLE AS PART OF A CLOSURE SYSTEM

The present invention relates generally to a planar composite for the production of a container surrounding an interior, comprising a. a carrier layer; b. a barrier layer of plastic joined to the carrier layer; c. at least one layer of a thermoplastic plastic KSa which is provided on the side of the barrier layer of plastic facing away from the carrier layer; wherein the carrier layer has at least one hole; wherein the at least one hole is covered by the barrier layer of plastic and the at least one layer KSa of thermoplastic plastic as composite layers, and a container with this composite, a process for the production of a container and a container obtainable by this process.

For a long time foodstuff, whether foodstuff for human consumption or also animal feed products, have been preserved by being stored either in a can or in a glass jar closed with a lid. The shelf life can, for example, be increased by disinfecting as far as possible in each case the foodstuff and the container, here the glass jar or can, separately and then filling the container with the foodstuff and closing it. Alternatively, shelf life can be increased by autoclaving the foodstuff while being in the container. However, these measures, which in themselves have been proven for a long time, for increasing the shelf life of foodstuff have a number of disadvantages.

Because of their essentially cylindrical shape, cans and glass jars have the disadvantage that very dense and space-saving storage is not possible. Furthermore, cans and glass jars have a considerable intrinsic dead-weight, which leads to an increased consumption of energy during transportation. A quite high consumption of energy is moreover necessary for the production of glass, tinplate or aluminium, even if the raw materials used for this originate from recycling. In the case of glass jars, an increased outlay on transportation is an added complication. The glass jars are usually prefabricated in a glassworks and must then be transported to the foodstuff filling plant utilizing considerable transportation volumes. Glass jars and cans moreover can be opened only with a considerable application of force or with the aid of tools, and therefore rather inconveniently. In the case of cans, there is also a high risk of injury from sharp edges which arise during opening. In the case of glass jars, glass splinters are forever entering into the foodstuff during filling or opening of filled glass jars, which in the worst case can lead to internal injuries on consumption of the foodstuff.

Other packaging systems for storing foodstuff for a long period of time as far as possible without impairment are known from the prior art. These are containers produced from planar composites—often also called laminate. Such planar composites are often built up from a layer of thermoplastic, a carrier layer usually made of cardboard or paper, an adhesion promoter layer, an aluminium layer and a further layer of plastic, as disclosed, inter alia, in WO 90/09926 A2.

These laminated containers already have many advantages over the conventional glass jars and cans. Nevertheless, possibilities for improvement also exist for these packaging systems. Thus, in regions of the planar composites which are exposed to high mechanical stresses during production of the container, small defects are at times being formed, such as cracks, blisters or unsealed pockets or microchannels up to leaks, in which germs can deposit themselves or penetrate into the container, and the foodstuff in the container can decay more easily. These germs in small defects of the containers cannot be counteracted even by a more intensive disinfecting of the foodstuff. Even the attempt at more intensive disinfection of the container before filling with the foodstuff scarcely leads to the desired long storage times. Any damage to an aluminium barrier layer furthermore leads to trouble spots in respect of entry of oxygen into the container, which in turn contributes towards losses in the quality of the foodstuff and therefore a shortened shelf life. Regions during production of the container which have creasing crosses and are folded particularly sharply or in several dimensions, for example in the corners of the base and top region of the containers, are particularly at risk.

Generally, the object of present invention is to at least partly eliminate the disadvantages emerging from the prior art.

An object according to the invention is furthermore to provide a process with which a container which is suitable, also in high piece numbers, for storing a foodstuff with a long shelf life and with easy removal, without the container having to be particularly intensively disinfected, can be produced.

An object according to the invention is moreover to reduce, with the same disinfecting of the foodstuff and of the container accommodating this, the proportion of foodstuff-filled containers with a low shelf life by renewed disinfecting of the foodstuff.

An object according to the invention is furthermore to provide a process which allows production of containers of at least the same quality compared with the prior art at increased production speeds.

An object according to the invention is furthermore to provide a composite region in a closed container which can be opened without excessively high application of force to form a clean hole, and in this context in the unopened state has a high tightness, in particular tightness to gas and liquid, so that foodstuff can be stored in the fresh state in this container for as long as possible, even if the container is exposed to mechanical stress, such as pressure. On formation of the hole, for example by means of an openable closure by pressing in, cutting or pulling out, the formation of threads and tongues, which have an adverse effect on the opening, pouring out or venting properties of the container contents, in particular is undesirable. If the hole is formed by puncture by means of a drinking straw, it is furthermore preferable for the drinking straw to be held as tightly as possible by the edges of the hole, so that emergence of the liquid from full liquid containers is limited as far as possible. It is furthermore preferable here for as little as possible, if any, adhesion promoter to have to be used.

An object is furthermore to provide an openable composite region which also retains its tightness during the considerable mechanical stresses which arise during folding or sealing, preferably ultrasonic sealing, in particular during formation of the head region.

A contribution towards achieving at least one of the above objects is made by the subject matter of the classifying claims. The subject matter of the sub-claims which are dependent upon the classifying claims represents preferred embodiments of this contribution towards achieving the objects.

A contribution towards achieving at least one of the above objects is made by a planar composite for the production of a container surrounding an interior, comprising as composite constituents a. a carrier layer;
b. a barrier layer of plastic joined to the carrier layer;
c. at least one layer of plastic KSa, preferably thermoplastic plastic KSa, which is provided on the side of the barrier layer of plastic facing away from the carrier layer, preferably at least two layers of thermoplastic plastic KSa and KSw, which are provided on the side of the barrier layer of plastic facing away from the carrier layer;
wherein the carrier layer has at least one hole, or also two and more holes; wherein the at least one hole is covered by the barrier layer of plastic and the at least one layer KSa of thermoplastic plastic as composite layers.

Embodiments with a single hole serve chiefly to release the foodstuff present in the container. A further hole can be provided, in particular, for venting the container during release of the foodstuff.

A further contribution towards achieving at least one of the abovementioned objects is made by a process for the production of a container according to the invention surrounding an interior, comprising the steps
α. provision of a planar composite according to the invention described here in more detail;
β. folding of the planar composite to form a fold with at least two fold surfaces adjacent to one another;
χ. joining respectively at least a part region of the at least two fold surfaces to form a container region.

The folding in step β. can be carried out in principle in any manner. According to the invention, however, cold folding and hot folding are preferred as two alternative embodiments or also embodiments which can be combined with one another. During cold folding, at least the layer of plastic KSa or the layers of plastic KSa and KSw and respectively the barrier layer of plastic is/are present in the solid form—and are thus not molten. During hot folding, at least the layer of plastic KSa or the layers of plastic KSa and KSw is/are present in the molten form and in each case the barrier layer of plastic is present in the solid form—and is thus not molten. In the process according to the invention, it is preferable for the container region which has at least one hole covered with composite layers to be produced by cold folding. Conversely, it is preferable for the container regions, for example the base of the container, which do not have a hole covered by composite layers to be produced by hot folding.

In one embodiment of the process according to the invention, it is furthermore preferable for the composite according to the invention to be provided with the steps comprising
V1. provision of a carrier layer which has the at least one hole;
V2. application of at least the barrier layer of plastic and the at least one layer KSa of thermoplastic plastic or the at least two layers of thermoplastic plastic KSa and KSw to the carrier layer as composite layers, the at least one hole being covered by the composite layers.

The following statements apply both to the planar composite according to the invention, the container according to the invention, and the process according to the invention for the production of a container.

The application in step V2. can be carried out simultaneously, but usually with a time lapse. Starting from the carrier layer, the composite layers are often applied to the carrier layer and optionally to the layers already present on the carrier layer by a number of laminating extruders, in which the particular thermoplastic plastics are melted, corresponding to the number of composite layers. It is also possible to apply a layer, for example the barrier layer of plastic, the layers of thermoplastic plastic KSa or the layer of thermoplastic plastic KSw, by means of two of more laminating extruders.

The abovementioned planar composite according to the invention corresponds to a further embodiment according to the invention, wherein c. at least two, or also three and more, layers of thermoplastic plastic KSa and KSw are provided on the side of the barrier layer of plastic facing away from the carrier layer, wherein at least one of the at least two layers of plastic is a plastics mixture of at least two plastics; wherein the carrier layer has at least one hole; wherein the at least one hole is covered by the barrier layer of plastic and the at least two layers of thermoplastic plastic KSa and KSw as composite layers.

The following statements on the layer of plastic KSa in connection with composite constituents c. with at least one layer of plastic KSa or with composite constituent c. with at least two layers of plastic KSa and KSw apply to both variants of the composite constituents c.

The at least one hole provided in the carrier layer can have any form which is known to the person skilled in the art and is suitable for various closures or drinking straws. The holes often have rounded edges in plan view. The holes can thus be essentially circular, oval, elliptical or tear-shaped. The shape of the at least one hole in the carrier layer usually also predetermines the shape of the opening, which is generated in the container either by an openable closure joined to the container, through which the contents of the container are removed from the container after the opening, or by a drinking straw. The openings of the opened container therefore often have shapes which are comparable to or even the same as the at least one hole in the carrier layer.

In connection with the covering of the at least one hole of the carrier layer, it is preferable for the composite layers, preferably for all composite layers, to be joined to one another at least partly, preferably over to the extent of at least 30%, preferably at least 70% and particularly preferably to the extent of at least 90% of the area formed by the at least one hole. It is furthermore preferable for the composite layers to be joined to one another in the region of the hole edges surrounding the at least one hole, and preferably to be joined adjacent to the hole edge, in order thus to achieve an improved tightness over a join extending over the entire hole area. The composite layers are often joined to one another over the region formed by the at least one hole in the carrier layer. This leads to a good tightness of the container formed from the composite and therefore to the desired high shelf life of the foodstuff kept in the container. According to one embodiment of the process according to the present invention, at least the barrier layer of plastic and the thermoplastic plastic layer KSa are joined to one another at least partly, preferably over to the extent of at least 30%, preferably at least 70% and particularly preferably to the extent of at least 90% of the area formed by the at least one hole. According to another embodiment of the process according to the present invention, at least the barrier layer of plastic and the thermoplastic plastic layer KSu, that is described hereafter, are joined to one another at least partly, preferably over to the extent of at least 30%, preferably at least 70% and particularly preferably to the extent of at least 90% of the area formed by the at least one hole.

The opening of the container is usually generated by at least partial destruction of the composite layers covering the at least one hole. This destruction can be effected by cutting, pressing into the container or pulling out of the container. The destruction can be effected by an openable closure joined to the container and arranged in the region of the at least one hole, usually above the at least one hole, or a drinking straw which is pushed through the composite layers covering the at least one hole.

The container which can be produced by the planar composite according to the invention preferably has at least one, preferably between 6 and 16 edges, particularly preferably between 7 and 12 edges. According to the invention, edge is understood as meaning in particular regions which, on folding of a surface, are formed by two parts of this surface lying over one another. Edges which may be mentioned by way of example are the elongated contact regions of respectively two wall surfaces of a container essentially in the shape of a rectangular parallelepiped. Such a container in the shape of a rectangular parallelepiped as a rule has 12 edges. In the container, the container walls preferably represent the surfaces of the container framed by the edges. The container walls of a container according to the invention are preferably formed to the extent of at least 50, preferably to the extent of at least 70 and moreover preferably to the extent of at least 90% of their surface, apart from the region formed by the at least one hole, from a carrier layer as part of the planar composite.

The term "joined" used here includes the adhesion of two objects beyond van der Waals forces of attraction. These objects can either follow one another directly or also be joined to one another via further objects. For the planar composite, this means, for example, that the carrier layer can be joined directly and therefore immediately to the barrier layer of plastic, or can also be joined indirectly via one or more layers, for example via one or more adhesion promoter layers, a direct joining being preferred. According to a particular embodiment of the planar composite, one of the two layers of thermoplastic plastic KSa or KSw is preferably bonded directly to the barrier layer of plastic.

According to the invention, it is preferable for the planar composite also to comprise one or two and more further layers in addition to a carrier layer, a barrier layer of plastic joined to the carrier layer and at least one or two layers of thermoplastic plastic KSa and KSw, which are provided on the side of the barrier layer of plastic facing away from the carrier layer. Preferably, the further layer or layers is/are adhesion promoter layers. According to one embodiment, these can be provided between the carrier layer and the barrier layer of plastic. It is, however, preferable that the barrier layer of plastic and the carrier layer are not joined to one another by means of an adhesion promoter layer. In another embodiment, an adhesion promoter layer can be provided between the barrier layer of plastic and one of the at least one or two layers of thermoplastic plastic KSa and KSw, in order to improve the cohesion of the layers and thus to make delamination difficult. In one embodiment according to the invention, an adhesion promoter layer is provided between the carrier layer and the barrier layer of plastic, the at least two layers of thermoplastic plastic KSa and KSw preferably following the barrier layer of plastic, preferably directly, on the side facing away from the carrier layer. In another embodiment according to the invention, no adhesion promoter layer is provided between the carrier layer and the barrier layer of plastic, but at least one adhesion promoter layer is arranged between the barrier layer of plastic and one of the layers of thermoplastic plastic KSa and KSw, preferably between the barrier layer of plastic and the layer of thermoplastic plastic KSa. Furthermore, in a further embodiment at least one adhesion promoter layer is arranged between the carrier layer and the barrier layer of plastic and at least one further adhesion promoter layer is arranged between the barrier layer of plastic and one of the layers of thermoplastic plastic KSa and KSw, preferably between the barrier layer of plastic and the layer if thermoplastic plastic KSa.

Possible adhesion promoters are all polymers which, by means of suitable functional groups, are suitable for generating a firm join by the formation of ionic bonds or covalent bonds to the surface of the other particular layer. Preferably, these are polyolefins functionalized by co-polymerization with acrylic acid, acrylates, acrylate derivatives or carboxylic acid anhydrides carrying double bonds, for example maleic anhydride, or at least two of these. Among these, polyethylene/maleic acid copolymers are particularly preferred, these being marketed, for example, by DuPont under the trade name Bynell®. It is accordingly preferred for none of the layers of thermoplastic plastic that may be present in the planar composite, to be an adhesion promoter. Preferably, the above described layers of thermoplastic plastic KSa and KSw and also the plastic layer KSu, that will be described later on, are not adhesion promoters.

In a preferred embodiment, at least one or two, or two to five, layers of thermoplastic plastic KSa and KSw joined to the barrier layer of plastic are provided, and the further layer of plastic KSw follows the layer of plastic KSa and preferably follows directly. It is furthermore preferable for the particular layer of plastic furthest removed from the carrier layer—often called a further layer of plastic KSw—to be present as a mixture of at least two plastics. It is furthermore preferable for the layer of thermoplastic plastic lying closest to the carrier layer—often called the layer of plastic KSa—to comprise an inorganic particulate filler. In one embodiment, the layer of plastic KSa is present with a filler content and the layer of plastic KSw is present as a mixture of at least two plastics.

In a further preferred embodiment, at least one, preferably at least two or also all of the at least two layers of thermoplastic plastic KSa and KSw has or have a melting temperature below the melting temperature of the barrier layer of plastic. The melting temperature of the at least one, preferably of the at least two or also of all the layers of thermoplastic plastic KSa and KSw and the melting temperature of the barrier layer of plastic preferably differ by at least 1 K, particularly preferably by at least 10 K, still more preferably by at least 20 K and moreover preferably at least 100 K. In the case of cold folding, the temperature difference should preferably be chosen only such that the melting temperature is not reached by any plastic of the barrier layer of plastic, and melting of the barrier layer of plastic thus does not occur during folding. In the case of joining by heating, the temperature difference should preferably be chosen only so high that the melting temperature is not reached by any plastic of the barrier layer of plastic, and melting of the barrier layer of plastic thus does not occur during joining.

According to the invention, folding is understood as meaning an operation in which preferably an elongated kink forming an angle is generated in the folded planar composite by means of a folding edge of a folding tool. For this, two adjacent surfaces of a planar composite are often bent ever more towards one another.

According to the invention, the joining can be effected by any measure which appears to be suitable to the person skilled in the art and which makes possible a join which is as gas- and liquid-tight as possible. The joining can be effected by sealing or gluing or a combination of the two measures. In the case of sealing, the join is created by means of a liquid and solidification thereof. In the case of gluing, chemical bonds which create the join form between the interfaces or surfaces of the two objects to be joined. In the case of sealing or gluing, it is often advantageous for the surfaces to be sealed or glued to be pressed together with one another.

The carrier layer of the composite or container according to the invention can conventionally be made of any material which is suitable for this purpose to the person skilled in the art and which has an adequate strength and rigidity to give the container stability to the extent that in the filled state the container essentially retains its shape. In addition to a number of plastics, plant-based fibrous substances, in particular celluloses, preferably sized, bleached and/or non-bleached celluloses are preferred, paper and cardboard being particularly preferred.

Generally, the barrier layer of plastic comprises, in each case based on this, at least 70 wt. %, preferably at least 80 wt. % and particularly preferably at least 95 wt. % of at least one plastic which is known to the person skilled in the art for this purpose, in particular because of aroma or gas barrier properties which are suitable for packaging containers. Preferably, thermoplastic plastics are employed here. According to the invention, it is preferable for the barrier layer of plastic to have a melting temperature in a range of from more than 155 to 300° C., preferably in a range of from 160 to 280° C. and particularly preferably in a range of from 170 to 270° C. Possible plastics, in particular thermoplastic plastics, here are plastics carrying N or O, both by themselves and in mixtures of two or more. The barrier layer of plastic is preferably as far as possible homogeneous and is therefore preferably obtainable from melts, such as are formed, for example, by extrusion, in particular laminating extrusion. In contrast, barrier layers of plastic which are obtainable by deposition from a solution or dispersion of plastics are preferred less since, in particular if deposition or formation takes place from a plastics dispersion, these often have at least partly particulate structures which show gas and moisture barrier properties which are less good compared with the barrier layers of plastic which are obtainable from melts.

In one embodiment according to the invention, the barrier layer of plastic is made of polyamide (PA) or polyethylene/vinyl alcohol (EVOH) or a mixture thereof.

All the PAs which appear to be suitable to the person skilled in the art for the production of and use in the containers are possible as a PA. PA 6, PA 6.6, PA 6.10, PA 6.12, PA 11 or PA 12 or a mixture of at least two of these are to be mentioned in particular, PA 6 and PA 6.6 being particularly preferred and PA 6 furthermore being preferred. PA 6 is commercially obtainable as amorphous polyamides under the trade names Akulon®, Durethan® and Ultramid® or also MXD6, Grivory® and Selar®. The molecular weight of the PA should preferably be chosen such that the molecular weight range chosen on the one hand makes a good laminating extrusion possible in the production of the planar composite for the container, and on the other hand the planar composite itself has adequately good mechanical properties, such as a high elongation at break, a high abrasion resistance and an adequate rigidity for the container. This results in preferred molecular weights, determined as the weight-average via gel permeation chromatography (GPC) (preferably based on the International Standard ISO/DIS 16014-3: 2003) with light scattering (preferably based on the International Standard ISO/DIS 16014-5:2003), in a range of from $3*10^3$ to $1*10^7$ g/mol, preferably in a range of from $5*10^3$ to $1*10^6$ g/mol and particularly preferably in a range of from $6*10^3$ to $1*10^5$ g/mol. Furthermore, in connection with the processing and mechanical properties, it is preferable for the PA to have a density in a range of from 1.01 to 1.40 g/cm$^3$, preferably in a range of from 1.05 to 1.3 g/cm$^3$ and particularly preferably in a range of from 1.08 to 1.25 g/cm$^3$. It is furthermore preferable for the PA to have a viscosity number in a range of from 130 to 185 ml/g and preferably in a range of from 140 to 180 ml/g, determined in accordance with ISO 307 in 95% sulphuric acid.

For the polyethylene/vinyl alcohol (EVOH) all polymers can be used which appear to be suitable to the person skilled in the art for the production of and use in the containers by the process according to the invention. Examples of suitable EVOH-copolymers include those resins which are sold under the trademark EVAL™ from EVAL Europe nv, Belgium, like EVAL™ F101B, EVAL™ F171B, EVAL™ T101B, EVAL™ H171B, EVAL™ E105B, EVAL™ F101A, EVAL™ F104B, EVAL™ E171B, EVAL™ FP101B, EVAL™ FP104B, EVAL™ EP105B, EVAL™ M100B, EVAL™ L171B, EVAL™ LR171B, EVAL™ J102B, EVAL™ C109B or EVAL™ G156B. Preferably, the EVOH-copolymers are characterized by at least one, more preferably all of the following properties:

- an ethylene-content in the range from 20 to 60 mol %, preferably from 25 to 45 mol %,
- a density (determined according to ISO 1183) in the range from 1.00 to 1.4 g/cm$^3$, preferably from 1.10 to 1.30 g/cm$^3$,
- a melt flow rate (determined according to ISO 1133 at 210° C. and 2.16 kg for melting temperatures below 210° C. and at 230° C. and 2.16 kg for melting temperatures between 210° C. and 230° C.) in the range from 1 to 15 g/10 min, preferably 2 g/10 min to 13 g/10 min;
- a melting temperature (determined according to ISO 11357) in the range from 155 to 235° C., preferably 165 to 225° C.;
- an oxygen transmission rate (determined according to ISO 14663-2 annex C at 20° C. and 65% RH) in the range from 0.05 to 3.2 cm$^3$·20 μm/m$^2$·day·atm, preferably 0.1 to 0.6 cm$^3$·20 μm/m$^2$·day·atm.

It is furthermore preferable for the polyamide layer, for the polyethylene/vinyl alcohol layer or for the layer that is a mixture of polyamide and polyethylene/vinylalcohol to have a weight per unit area in a range of from 2 to 120 g/m$^2$, preferably in a range of from 3 to 75 g/m$^2$ and particularly preferably in a range of from 5 to 55 g/m$^2$. It is moreover preferable for the polyamide layer, for the polyethylene/vinyl alcohol layer or for the layer that is a mixture of polyamide and polyethylene/vinylalcohol to have a thickness in a range of from 2 to 90 μm, preferably a range of from 3 to 68 μm and particularly preferably in a range of from 4 to 50 μm.

Generally, the at least one or the at least one of the at least two layers of thermoplastic plastic KSa and KSw comprises, in each case based on this, at least 70 wt. %, preferably at least 80 wt. % and particularly preferably at least 95 wt. % of at least one thermoplastic plastic which appears to be suitable to the person skilled in the art for this purpose, and in particular for the purpose of the extrusion, protection of the carrier layer and a good sealability.

In a further embodiment, the at least one or the at least one of the at least two layers of thermoplastic plastic KSa and KSw is filled with a particulate inorganic solid. Possible particulate inorganic solids are all the solids which appear to be suitable to the person skilled in the art and which, inter alia, lead to an improved distribution of heat in the plastic and therefore to a better sealability of the plastic.

Preferably, the average particle sizes (d50%) of the inorganic solids, determined by sieve analysis, are in a range of from 0.1 to 10 µm, preferably in a range of from 0.5 to 5 µm and particularly preferably in a range of from 1 to 3 µm. Possible inorganic solids are, preferably, metal salts or oxides of di- to tetravalent metals. Examples which may be mentioned here are the sulphates or carbonates of calcium, barium or magnesium or titanium dioxide, preferably calcium carbonate.

The amount of the particulate inorganic solid in layers KSa and/or KSw may be in the range from 0.1 to 30 wt. %, preferably 0.5 to 20 wt. % and more preferably 1 to 5 wt. %, based on the total weight of layer KSa and KSw, respectively.

In a further embodiment of the process according to the invention, it is preferable for the fold surfaces to form an angle $\mu$ of less than 90°, preferably of less than 45° and particularly preferably of less than 20°. The fold surfaces are often folded to the extent that these come to lie on one another at the end of the folding. This is advantageous in particular if the fold surfaces lying on one another are subsequently joined to one another in order to form the container base and the container top, which is often configured gable-like or also flat. Regarding the gable configuration, reference may be made by way of example to WO 90/09926 A2. In another embodiment, the container top can also be flat in shape. Preferably, the top region has the at least one hole covered with the composite layers. Thus, via the top region, for example, a drinking straw can be introduced or an openable closure can be provided, with which the composite layers can be treated for opening the closed container via, for example, perforating, puncturing, cutting open or tearing open.

In another embodiment according to the invention, it is preferable for the plastics mixture preferably to comprise as one of at least two mixture components 10 to 50 wt. %, preferably 15 to 45 wt. % and particularly preferably 20 to 40 wt. % or also more than 50 to 95 wt. %, preferably 60 to 90 wt. % and particularly preferably 75 to 85 wt. %, in each case based on the plastics mixture, of a polyolefin prepared by means of a metallocene (m-polyolefin). In addition to the good sealability, m-polyolefins show, in particular at higher concentrations, a relatively low stress corrosion cracking with foodstuff of high fat or free fat content. Moreover, one or more additives which differ from the polymers described above can be present in the plastics mixture to the extent of a maximum of 15 wt. %, preferably a maximum of 10 wt. % and particularly preferably 0.1 to 5 wt. %, in each case based on the plastics mixture. It is furthermore preferable for up to a total of 100 wt. %, in each case based on the plastics mixture, of at least one, entirely also two or more, thermoplastic plastics which differ from the m-polyolefin and, if additives are present, also differ from these, to be present in the plastics mixture. In particular, m-polyethylene or m-polypropylene prepared by means of metallocenes, or a mixture of both, are possible as the m-polyolefin, m-polyethylene being particularly preferred. These measures contribute in particular towards widening the sealing window. Furthermore, in a preferred embodiment according to the invention, at least one or the at least two layers of thermoplastic plastic have a melting temperature in the range of from 80 to 155° C., preferably in a range of from 85 to 145° C. and particularly preferably in a range of from 90 to 125° C. This temperature range promotes joining by sealing. In a further preferred embodiment, in the planar composite the at least one or two layers of thermoplastic plastic are provided, with respect to the carrier layer, towards the interior of the finished container.

Furthermore, in one embodiment according to the invention at least one further layer of thermoplastic plastic KSu is provided, with respect to the carrier layer, facing away from the interior and is joined to the carrier layer. At least one further layer of plastic KSa thus faces, with respect to the carrier layer, the surroundings of the finished container. It is preferable for the at least one further layer of thermoplastic plastic KSu to have a melting temperature in a range of from 80 to 155° C., preferably in a range of from 90 to 145° C. and particularly preferably in a range of from 95 to 125° C. It is furthermore preferable for the further layer of thermoplastic plastic KSu to comprise a thermoplastic plastic polymer to the extent of at least 70 wt. %, preferably at least 80 wt. % and particularly preferably at least 95 wt. %, in each case based on the further layer of thermoplastic plastic KSu. Just as in the case of the layers of plastic KSa and KSw, the layer of plastic KSu can also comprise inorganic particles, in addition to at least one thermoplastic plastic polymer. The amount of the inorganic particles in layer KSu may be in the range from 0.1 to 30 wt. %, preferably 0.5 to 20 wt. % and more preferably 1 to 5 wt. %, based on the total weight of layer KSu.

Suitable thermoplastic plastic polymers are polymers obtained by chain polymerization, in particular polyolefins, among these cyclic olefin copolymers (COC), polycyclic olefin copolymers (POC), in particular polyethylene, polypropylene or a mixture of polyethylene and polypropylene being preferred and polyethylene being particularly preferred. The melt indices, determined by means of DIN 1133 (for polyethylene preferably determined at 190° C. and 2.16 kg and for polypropylene preferably determined at 230° C. at 2.16 kg), of the thermoplastic plastic polymers are preferably in a range of from 3 to 15 g/10 min, preferably in a range of from 3 to 9 g/10 min and particularly preferably in a range of from 3.5 to 8 g/10 min.

Among the polyethylenes, HDPE, LDPE, LLDPE, MDPE and PE and mixtures of at least two of these are preferred according to the invention. The melt indices, determined by means of DIN 1133 (preferably determined at 190° C. and 2.16 kg), are preferably in a range of from 3 to 15 g/10 min, preferably in a range of from 3 to 9 g/10 min and particularly preferably in a range of from 3.5 to 8 g/10 min. In a preferred embodiment, the layer of thermoplastic plastic Ksa, and preferably also the thermoplastic plastic layer KSu, is made of LDPE.

Furthermore, in one embodiment of the process according to the invention, at least one of the at least two, or also all of the layers of thermoplastic plastic is or are heated above the melting temperature of the layers of thermoplastic plastic directly before step β. It is also preferable here additionally for likewise the at least one further layer of plastic KSu to be heated above the melting temperature of this further layer of plastic before step β. Preferably, before step β., particularly preferably directly before step β., heating is carried out to temperatures which are at least 1 K, preferably at least 5 K and particularly preferably at least 10 K above the melting temperature of these layers. The temperature should as far as possible be above the melting temperature of the particular plastic to the extent that, due to the folding, moving and pressing, the plastic does not cool to the extent that this becomes solid again.

Preferably, the heating to these temperatures is carried out by irradiation, by mechanical vibrations, by contact with a hot solid or hot gas, preferably hot air, by induction, by middle- or high frequency application or a combination of these measures. In the case of irradiation, any type of radiation which is suitable to the person skilled in the art for softening the plastics is possible. Preferred types of radiation are IR rays, UV rays and microwaves. Preferred type of vibration isultrasonic sound. In the case of IR rays, which are also employed for IR welding of planar composites, wavelength ranges of from 0.7 to 5 μm are to be mentioned. Laser beams in a wavelength range of from 0.6 to less than 10.6 μm can furthermore be employed. In connection with the use of JR rays, these are generated by various suitable lamps which are known to the person skilled in the art. Short wavelength lamps in the range of from 1 to 1.6 μm are preferably halogen lamps. Medium wavelength lamps in the range of from >1.6 to 3.5 μm are, for example, metal foil lamps. Quartz lamps are often employed as long wavelength lamps in the range of >3.5 μm. Lasers are ever more often employed. Thus, diode lasers are employed in a wavelength range of from 0.8 to 1 μm, Nd:YAG lasers at about 1 μm and $CO_2$ lasers at about 10.6 μm. High frequency techniques with a frequency range of from 10 to 45 MHz, often in a power range of from 0.1 to 100 kW, are also employed.

In the case of ultrasonic sound as a mechanical vibration which is preferred in particular during joining, in addition to folding, at least one, preferably all, of the following sealing parameters is/are preferred:

P1 a frequency in a range of from 5 to 100 kHz, preferably in a range of from 10 to 50 kHz and particularly preferably in a range of from 15 to 40 kHz;

P2 an amplitude in a range of from 2 to 100 μm, preferably in a range of from 5 to 70 μm and particularly preferably in a range of from 10 to 50 μm;

P3 a vibration time (as the period of time in which a vibrating body, such as a sonotrode, acts in contact vibration on the planar composite) in a range of from 50 to 1,000 msec, preferably in a range of from 100 to 600 msec and particularly preferably in a range of from 150 to 300 msec.

It is furthermore preferable for a holding time to follow the vibration time. This is as a rule chosen such that the plastics melted during the vibration time solidify again. The holding time is often in a range of from 50 to 2,000 msec, preferably in a range of from 100 to 1,200 msec and particularly preferably in a range of from 150 to 600 msec. In the case of the holding time, it is furthermore preferable for the pressures acting during the vibration time on the part region of the planar composite to be joined fall by only a maximum of 10% and preferably a maximum of 5% during the holding time.

For a suitable choice of the radiation or vibration conditions, it is advantageous to take into account the intrinsic resonances of the plastics and to choose frequencies close to these.

Heating via contact with a solid can be effected, for example, by a heating plate or heating mould which is in direct contact with the planar composite and releases the heat to the planar composite. Hot air can be directed on to the planar composite by suitable fans, outlets or nozzles or a combination thereof. Contact heating and hot gas are often employed simultaneously. Thus, for example, a holding device which holds a sleeve formed from the planar composite and through which hot gas flows, and which is thereby heated and releases the hot gas through suitable openings can heat the planar composite by contact with the wall of the holding device and the hot gas. Furthermore, the sleeve can also be heated by fixing the sleeve with a sleeve holder and directing a flow from one or two and more hot gas nozzles provided in the sleeve holder on to the regions of the sleeve to be heated.

The sealing temperature is preferably chosen such that the plastic(s) involved in the sealing is/are present as a melt. Furthermore, the sealing temperature chosen should not be too high, in order that the exposure of the plastic(s) to heat is not unnecessarily severe, so that they do not lose their envisaged material properties. The sealing temperatures are therefore at least 1 K, preferably at least 5 K and particularly preferably at least 10 K above the melting temperature of the particular plastic.

In a further preferred embodiment of the process according to the invention, it is envisaged that the container is filled with a foodstuff or with an ingredient useful for the preparation of a foodstuff before step β. or after step χ. All the foodstuff and ingredients known to the person skilled in the art for human consumption and also animal feed are possible as the foodstuff. Preferred foodstuff are liquid above 5° C., for example drinks. Preferred foodstuff are dairy products, soups, sauces, non-carbonated drinks, such as fruit drinks and juices or teas. Lumpy materials can also be included in the container. The foodstuff or ingredients can on the one hand be filled after disinfection beforehand into a container likewise disinfected beforehand. Furthermore, the foodstuff or ingredients can be disinfected after filling and closing in the container accommodating them. This is as a rule carried out by autoclaving.

In the embodiment of the process according to the invention in which the container is filled with foodstuff or with the ingredient before step β., it is preferable for a tubular structure with a fixed longitudinal seam first to be formed from the planar composite by folding and sealing or gluing the overlapping borders. This tubular structure is compressed laterally, fixed and separated and formed into an open container by folding and sealing or gluing. The foodstuff or the ingredient here can already be filled into the container after the fixing and before the separation and folding of the base in the sense of step β.

In the embodiment of the process according to the invention in which the container is filled with foodstuff or with the ingredient after step χ., it is preferable for a container which is obtained by shaping the planar composite and is closed in the region of the base and opened in the region of the top to be employed. Alternatively, a container can be employed that is obtained by shaping the planar composite and closing it in the region of the top with an opening in the region of the base. Shaping of the planar composite and obtaining of such an opened container can be effected by steps β. and χ. by any procedure which appears to be suitable for this to the person skilled in the art. In particular, shaping can be carried out by a procedure in which sheet-like container blanks which already take into account the shape of the container in their cut-out are folded such that an opened container is formed over a mandrel. This is as a rule effected by a procedure in which after folding of this container blank, its longitudinal edges are sealed or glued to form a side wall and the one side of the sleeve is closed by folding and further fixing, in particular sealing or gluing.

In another embodiment according to the invention, it is preferable for the planar composite to have at least one crease and for the folding to take place along the crease. A crease is as a rule a usually linear region of the planar composite in which the planar composite is compacted more along this line, compared with the regions adjacent to the line or crease, by a stamping tool. The crease is often formed on one side of the planar composite as a recess running along a line with a bulge running on the other side of the planar composite opposite the recess. This facilitates the folding and the formation of a kink running along the line prepared by the crease, in order to achieve in this way a fold which is as uniform and accurately positioned as possible. Preferably, the crease divides the planar composite into a part of large area and a part of small area compared with the part of large area. Thus, for example, the part of large area can be the side wall of the container and the part of small area can be a surface of the planar composite which forms the base. Furthermore, the part of small area can be the region of the planar laminate which is joined after the folding, in particular by sealing. The crease can be provided at various stages of the production of the planar composite. According to one embodiment, the crease is made in the planar composite after the coating with thermoplastic plastics, which is usually carried out by co-extrusion. In another embodiment, scoring is carried out before the co-extrusion, preferably directly into the carrier layer.

In connection with the filling operation, according to one embodiment of the process according to the invention it is preferable for the foodstuff or the ingredient to be at least partly disinfected before the filling operation. This can be carried out by sterilization, ultra-high heating or pasteurizing. Furthermore, in a preferred embodiment of the process according to the invention, the container or container precursor is itself at least partly disinfected before the filling operation. This can be carried out by sterilizing, preferably by peroxides, in particular hydrogen peroxide or peroxoacetic acid, or radiation. In the process according to the invention it is furthermore preferable for both the above-mentioned embodiments to be realized and if possible for the operation to be germ-free. A temperature of more than 50° C., preferably more than 80° C., is often employed for the disinfecting.

In the process according to the invention, the at least one, preferably at least two and particularly preferably each of the at least one or at least two layers of thermoplastic plastic of the part of small area is/are heated above the melting temperature in step β., so that hot folding occurs. In another embodiment of the process according to the invention, it is preferable for at least one, preferably at least two and particularly preferably each of the at least two layers of thermoplastic plastic to be kept below their melting temperature in step β., so that cold folding occurs. These two embodiments of the process can both be employed in the formation of various regions of the container according to the invention. It is furthermore preferable in one embodiment in the process according to the invention for the fold to be formed by an edge of a folding tool pressing into the crease. This is the case in particular when the base region is formed. It is furthermore preferable in another embodiment for the fold to be formed by an edge of a folding tool pressing alongside the crease. In this case the edge of the folding tool is usually set directly alongside the crease. This type of folding, preferably cold folding, is preferably employed in the formation of the top region which is gable-like in shape.

The creases are usually provided in the planar composite before or after step α, bit before step β.

Usually the creases are provided in the planar composite after step α, bit before step β. In this case, a planar composite is therefore preferably provided in step α. As a rule the planar composite is usually produced as roll goods by co-extrusion of the individual layers of the planar composite. The creases are provided, preferably applied on these roll goods. Optionally, container blanks can be obtained from the roll goods and provided as planar composite in step α. In these container blanks creases can subsequently be produced or the creases can be produced in the roll good before preparing the container blanks. However, it is also possible for the creases to be produced in the carrier layer already before the co-extrusion. In this case the creases are provided in the planar composite before step α.

In a further embodiment according to the invention, it is preferable for no metal foil, often no aluminium foil, to be provided in the planar composite between the carrier layer and the at least one or the at least two layers of thermoplastic plastic KSa and KSw. The barrier layer of plastic as a rule has sufficiently good barrier properties. Thus, the planar composite employed according to the invention can be configured overall in a form free from metal foils, in particular free from aluminium foils. By this means a composite or a container produced therefrom which is free from metal can be provided. Under "free from metal" it is understood that the composite does not comprise any metal layer, such as an aluminum foil. The expression "free from metal", however, does not exclude the presence of a layer which, as a filler, comprises metal salts.

It is furthermore preferable in one embodiment according to the invention for an openable closure to be provided in the region of the at least one hole. It is preferable here for the closure to be provided on the surface of the composite which represents the outside of the container. In this context, it is preferable for the closure to at least partly, preferably completely, cover the composite layers covering the at least one hole. The closure thus protects the composite layers, which are less robust compared with the regions outside the at least one hole, from harmful mechanical effects. For opening the composite layers covering the at least one hole, the closure often has an opening means. Hooks for tearing out at least a part of the composite layers covering the at least one hole, edges for cutting into the composite layers covering the at least one hole or mandrels for perforating the composite layers covering the at least one hole or a combination of at least two of these are suitable, for example, as such an opening means. These opening means are often coupled mechanically with a screw lid or a cap of the closure, for example via a hinge. So that when the screw lid or the cap is operated, the opening means act on the composite layers covering the at least one hole to open the closed container via the at least one hole. Such closure systems comprising composite layers covering a hole, and openable closures which cover this hole and have an opening means are occasionally called "overcoated holes" with "applied fitments" in the technical literature.

In the process according to the invention, in a further embodiment a further folding follows step χ. as step δ., in the further folding at least one, preferably each of the at least two layers of thermoplastic plastic having a temperature which is below the melting temperature of this layer of plastic. The above statements on folding in step β. furthermore also apply here. A sequence of cold folding, hot sealing and further cold folding arises as a result. This sequence is particularly advantageous in the top region of a container in the shape of a rectangular parallelepiped. The essentially triangular regions, called ears, in which locally at least three planar composites come to lie on one another, are fixed here to two opposed sides of the container, in case of a brick-shaped container to the narrow sides of the container, preferably by sealing or gluing, after the container has been closed, the creased crosses formed as a result having particularly few defects, such as breaks in the creased cross, due to this sequence in combination with the planar composite described here. Furthermore, particularly few cracks, in particular in the barrier layer of plastic, in the region of the composite layers which cover the at least one hole are observed. Thus, even in a process for the production of containers with at least one covered hole carried out at high speeds, only a very small number with an unsatisfactory tightness to gas and liquid are obtained.

A container which is easy to open and particularly well-suited to long-term storage of foodstuff, which can be disinfected under gentle conditions, is obtainable by the process according to the invention. Furthermore, the container is simple and advantageous to produce. In the case of such a container according to the invention made from the composite according to the invention, it is preferable for this to be made to the extent of at least 70%, preferably at least 85% and particularly preferably at least 95% of its outer surface from a composite according to the invention with at least one hole covered by composite layers. It is furthermore preferable for the container to have an openable closure. In connection with the openable closure, reference is made to the above statements.

Test Methods:

Unless specified otherwise herein, the parameters mentioned herein are measured by means of DIN specifications.

FIGURES

The present invention is now explained in more detail by drawings given by way of example which do not limit it, the figures showing 1 a diagram of a container according to the invention, 2 a process flow diagram of the process according to the invention, 3 a diagram of a region of a container according to the invention, 4a a diagram of folding by the process according to the invention, 4b a diagram of a fold by the process according to the invention, 5a a diagram along a section A-A in the unfolded state, 5b a diagram along a section A-A in the folded state, 6 a diagram of a planar composite according to the invention, 7 a diagram of a planar composite according to the invention, 8 a diagram of a hole according to the invention covered with composite layers with an openable closure with opening means as parts of a closure system, 9 a diagram of a composite layer structure as a section of FIG. 8.

FIG. 1 shows a container 2 surrounding an interior 1 and made of a planar composite 3. For a better view, the container 2 is shown with the container top 12, having ears 35 on the side bent sharply and joined to the planar composite 3 on the outside of the container, facing upwards. In the top region the container 2 has a covered hole 34, over which an openable closure (not shown) can be provided.

Figure 2:
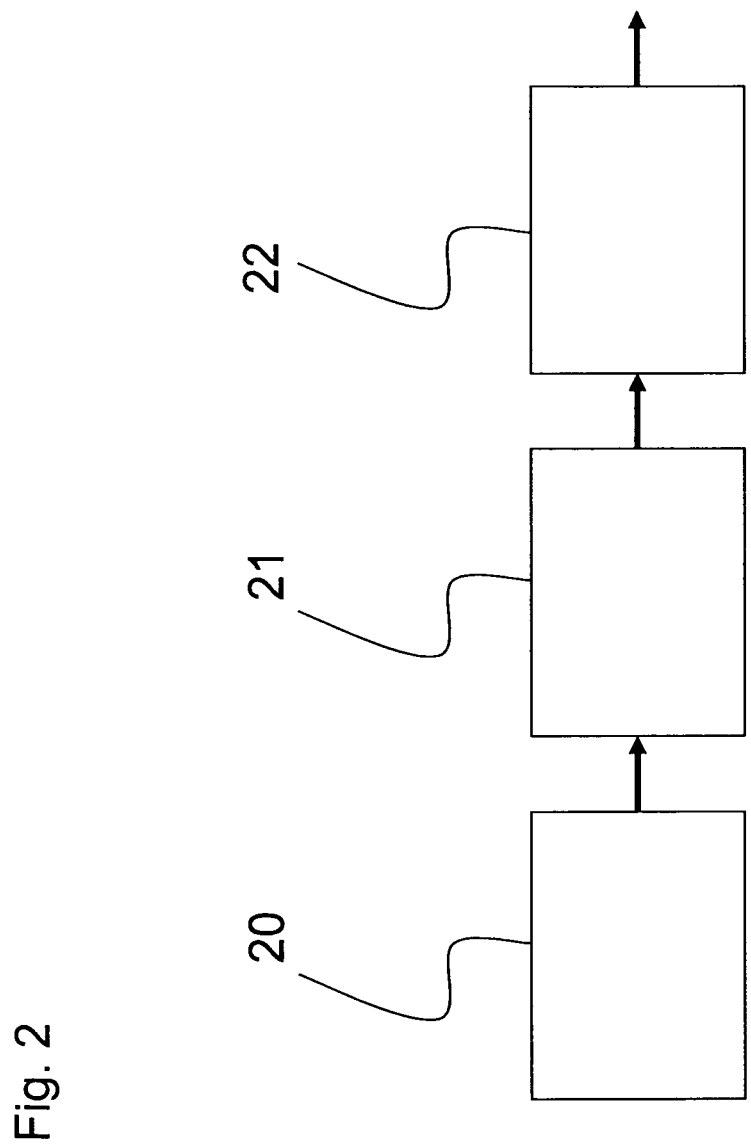

FIG. 2 shows a flow diagram of devices and production steps by the process according to the invention. In a composite production 20, the planar composite 3 is produced from a carrier layer 4 having a hole 28, a barrier layer 5 of plastic and the layers 6, 7 of thermoplastic plastic KSa and KSw and optionally a further layer 13 of thermoplastic plastic KSu and—if necessary—an adhesion promoter layer 19 by an extrusion process and is usually provided as roll goods. In a composite fabrication 21 which follows the composite production 20 indirectly or directly, the crease 14 is produced in the roll goods, which can have been provided with an imprint or decoration beforehand. Furthermore, if the roll goods provided with creases 14 are not employed as such for the production of containers, container blanks are produced in the composite fabrication 21. The composite fabrication 21 is followed by a container production 22, in which in particular the folding and joining take place by the process according to the invention. Filling with a foodstuff can also be carried out here. After the container has been filled with the foodstuff, the container is closed by a further folding and sealing operation, which can also take place in the container production 22 or in a subsequent production unit.

Figure 3:
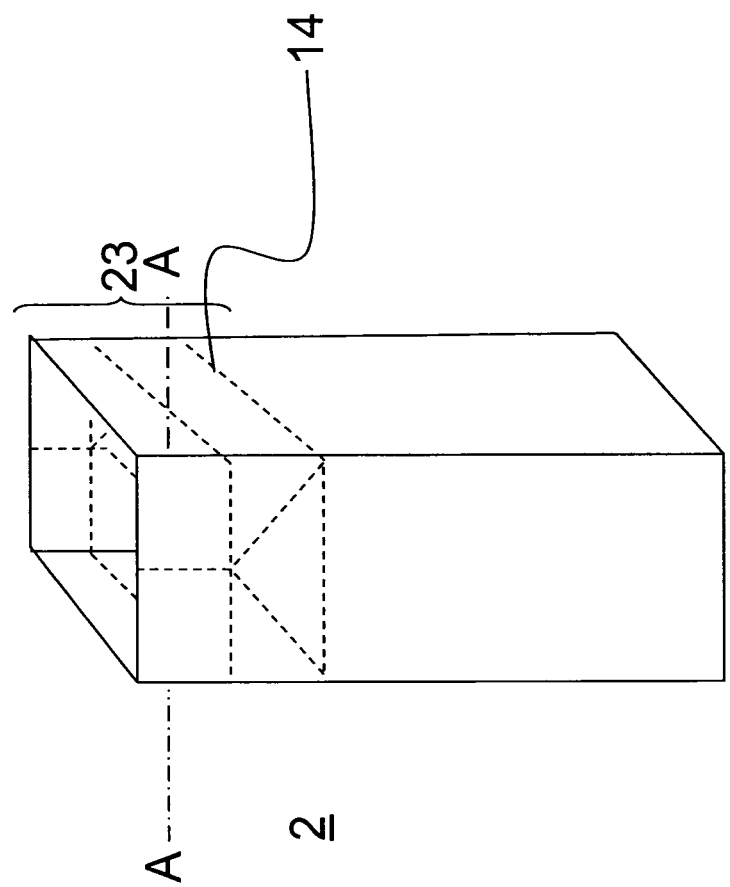

FIG. 3 shows a container 2 according to the invention, which—for a better view—is shown with a container region 23 envisaged for a base on the top. The container region 23 envisaged for the base has a plurality of creases 14.

Figure 4A:
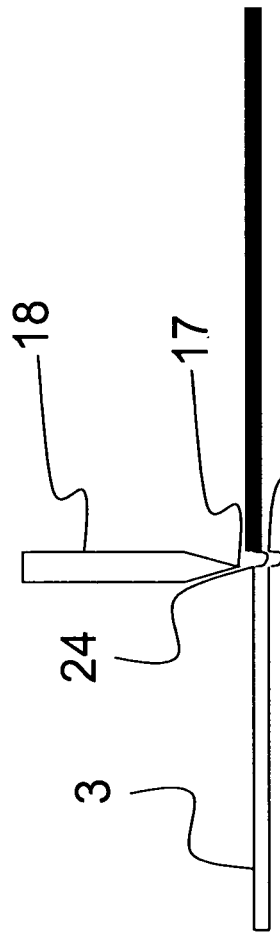
Figure 4B:
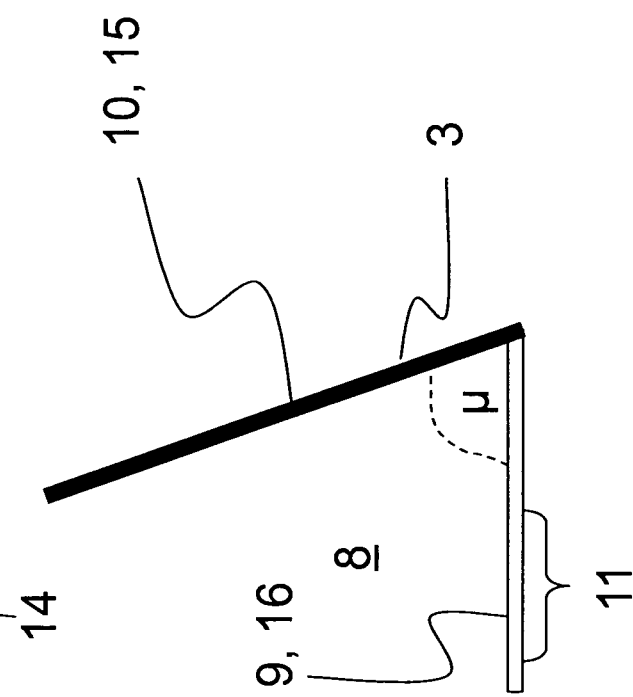

FIG. 4a shows the cross-section through a planar composite 3 with a crease 14, formed by a recess 24 and a bulge 25. An edge 17 of a folding tool 18 is provided above the recess 24, in order to engage in the recess 24, so that folding can be carried out around the edge 17 along the crease 14, in order to obtain a fold 8 shown as a cross-section in FIG. 4b. This fold 8 has two fold surfaces 9 and 10 which enclose an angle μ and are present as a part 15 of large area and a part 16 of small area. At least one layer 6, 7 or 13 of thermoplastic plastic is melted in a part region 11 of the part 16 of small area. By pressing the fold surfaces 9, 10 together, reducing the angle μ to 0°, the two fold surfaces 9, 10 are joined to one another by sealing.

FIG. 5a shows a section along the line A-A in FIG. 3, before folding, from a planar composite 3 with creases 14. By edges 17 of folding tools 8 which engage in the creases 14 installed centrally on the front faces, the creases 14 are moved in the direction of the two arrows, as a result of which the folds 8 shown in FIG. 5b with the angles μ are formed. The section shown here through the outermost part to be folded of the container region envisaged for the base of the container 2 has a part region 11 towards the interior 1 in which at least one layer 6, 7 or 13 of thermoplastic plastic is melted. By pressing together the longitudinal sides 26, reducing the six angles μ to 0°, the two inner surfaces 27 of the longitudinal sides 26 facing the interior 1 are joined to one another by sealing, in order thus to create the base.

FIG. 6 shows a planar composite 3, the upper side lying on the outside of the container 2 produced therefrom and the under-side on the inside. The resulting construction from the outside inwards is as follows: at least one further layer 13 of thermoplastic plastic KSu (usually PE optionally filled with a filler content of an inorganic particle, such as an inorganic salt) with a weight per unit area in a range of from 8 to 60 g/m², followed by a carrier layer 4 of cardboard with a weight per unit area in a range of from 120 to 400 g/m², followed by a barrier layer 5 of plastic, usually of PA or EVOH, with a weight per unit area in a range of from 2 to 50 g/m², followed by at least one layer of adhesion promoter 19 with a weight per unit area in a range of from 2 to 30 g/m², followed by a first layer 6 of thermoplastic plastic KSa, usually of PE (optionally with a filler content of an inorganic particle, such as an inorganic salt), with a weight per unit area in a range of from 2 to 60 g/m², followed by an at least second layer 7 of thermoplastic plastic KSw, usually of a blend of PE and m-PE, with a weight per unit area in a range of from 2 to 60 g/m².

In FIG. 7, the planar composite from FIG. 6 is supplemented by a further layer 19 of adhesion promoter with a weight per unit area in a range of from 2 to 30 g/m² provided between the barrier layer 5 of plastic and the carrier layer 4.

FIG. 8 shows a diagram of the cross-section of a section of the top region of a container according to the invention. A planar composite 3 with the details of the layer construction shown in FIG. 7 has a hole 28 which is demarcated via a hole edge 32. In the hole 28 are located composite layers 29, which are shown in more detail in the their layer construction in FIG. 9. Due to the absence of the carrier layer 4 in the region of the hole 28, the composite layers 29 surround, along the hole edge 32 in a moisture-tight manner, the carrier layer 4 extending to the hole edge 32 and cover the hole 28, so that the container is closed off in a manner which is as liquid- and gas-tight as possible. On the outside of the container 2 an openable closure 30 covering the hole 28 is provided. The closure 30 has an opening means 31, which is joined to the composite layers 29 and can be swivelled via a joint 33 in the direction of the broken arrow. When the opening means 31 is swivelled in the direction of the arrow, the composite layers 29 are torn open and the closed container 2 is opened in this way.

Figure 9:
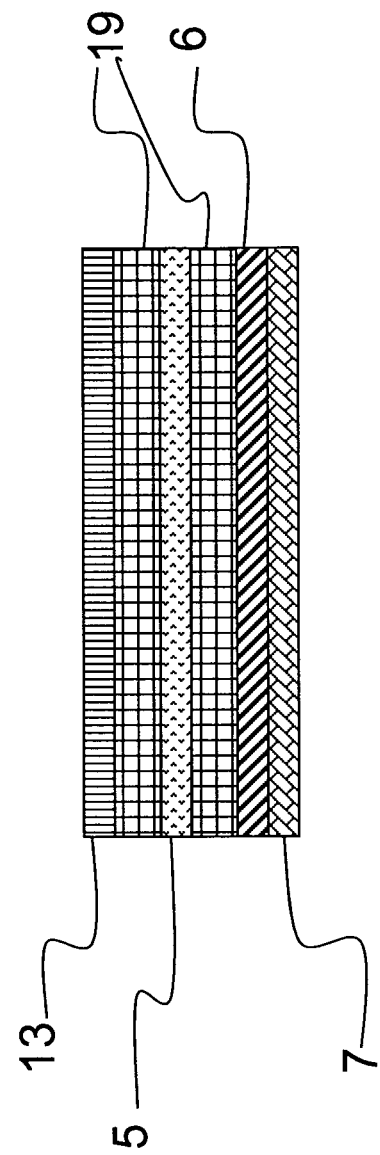

FIG. 9 shows a diagram of the cross-section of the composite layers 29 which extend within the hole bordered by the hole edge 32. Starting from the planar composite shown in FIG. 7, the composite layers shown in FIG. 9 differ in that the carrier layer 3 is missing.

LIST OF REFERENCE SYMBOLS

1 Interior
2 Container
3 Planar composite
4 Carrier layer
5 Barrier layer of plastic
6 Layer of thermoplastic plastic KSa
7 Layer of thermoplastic plastic KSw
8 Fold
9 Fold surface
10 Further fold surface
11 Part region
12 Container region (top/base)
13 Further layer of thermoplastic plastic KSu
14 Crease
15 Part of large area
16 Part of small area
17 Edge
18 Folding tool
19 Adhesion promoter
20 Composite production
21 Composite fabrication
22 Container production
23 Container region
24 Recess
25 Bulge
26 Longitudinal sides
27 Inner surface
28 Hole
29 Composite layers
30 Closure
31 Opening means
32 Hole edge
33 Joint
34 Covered hole
35 Ear

The invention claimed is:

1. A planar composite for the production of a container surrounding an interior, comprising a. a carrier layer;
 b. a barrier layer of plastic joined to the carrier layer; and
 c. at least two layers of thermoplastic plastic are provided on the side of the barrier layer of plastic facing away from the carrier layer, wherein at least one of the at least two layers of plastic is a plastics mixture of at least two plastics;
 wherein the carrier layer has at least one hole;
 wherein the at least one hole is covered by the barrier layer of plastic and the at least two layers of thermoplastic plastic as hole-covering layers, wherein no metal foil is provided between the carrier layer and the at least two layers of thermoplastic plastic.

2. The composite according to claim 1, wherein at least one of the at least two layers of thermoplastic plastic has a melting temperature below the melting temperature of the barrier layer of plastic.

3. The composite according to claim 1, wherein the at least two layers of thermoplastic plastic have a melting temperature in the range of from 80 to 155° C.

4. The composite according to claim 1, wherein at least one of the at least two layers of thermoplastic plastic is filled with a particulate inorganic solid.

5. The composite according to claim 1, wherein the at least two layers of thermoplastic plastic are made of a polyethylene or a polypropylene or a mixture of at least two of these.

6. The composite according to claim 5, wherein the plastics mixture comprises a polyolefin prepared by means of a metallocene as one of at least two mixture components.

7. The composite according to claim 6, wherein the plastic mixture comprises as one of the at least two mixture components 10 to 50 wt. %, based on the plastics mixture, of the polyolefin prepared by means of a metallocene.

8. The composite according to claim 6, wherein the plastic mixture comprises as one of the at least two mixture components 50 to 95 wt, %, based on the plastics mixture, of the polyolefin prepared by means of a metallocene.

9. The composite according to claim 1, wherein at least one further layer of thermoplastic plastic is joined to the carrier layer on the face of the carrier layer opposite the barrier layer.

10. The composite according to claim 9, wherein the further layer of thermoplastic plastic comprises a polyethylene, a polypropylene or a mixture of these.

11. The composite according to claim 9, wherein the at least one further layer of thermoplastic plastic has a melting temperature in a range of from 80 to 155° C.

12. The composite according to claim 9, wherein the barrier layer of plastic has a melting temperature in a range of from more than 155 to 300° C.

13. The composite according to claim 9, wherein the barrier layer of plastic is made of polyamide or polyethylene vinyl alcohol or a mixture thereof.

14. A container made from the composite according to claim 1.

15. A process for the production of a container surrounding an interior, comprising the steps α. providing a planar composite, comprising
  a. a carrier layer;
  b. a barrier layer of plastic joined to the carrier layer; and
  c. at least two layers of thermoplastic plastic which are provided on the side of the barrier layer of plastic facing away from the carrier layer,
 wherein at least one of the at least two layers of plastic is a plastics mixture of at least two plastics, wherein the carrier layer has at least one hole, and
wherein the at least one hole is covered by the barrier layer of plastic and the at least two layers of thermoplastic plastic as hole-covering layers, wherein no metal foil is provided between the carrier layer and the at least two layers of thermoplastic plastic;

β. folding the planar composite to form a fold with at least two fold surfaces adjacent to one another; and χ. joining respectively at least a part region of the at least two fold surfaces to form a container region.

16. The process according to claim 15, wherein the composite is provided with the steps comprising providing a carrier layer which has at least one hole; and applying the barrier layer of plastic and the at least two layers of thermoplastic plastic to the carrier layer as hole-covering layers, wherein the at least one hole is covered by the hole-covering layers.

17. The process according to claim 15, wherein at least one of the at least two layers of thermoplastic plastic in step β. is heated above the melting temperature thereof.

18. The process according to claim 15, wherein at least one of the at least two layers of thermoplastic plastic in step β. is kept below the melting temperature thereof.

19. The process according to claim 15, wherein the container is filled with a foodstuff before step β. or after step χ.

20. A container obtainable by the process according to claim 15.

* * * * *